(12) United States Patent
Randall et al.

(10) Patent No.: US 10,776,266 B2
(45) Date of Patent: Sep. 15, 2020

(54) APPARATUS AND METHOD OF MODIFICATION OF STORED DATA

(71) Applicant: Arm Limited, Cambridge (GB)

(72) Inventors: Joshua Randall, Austin, TX (US); Alejandro Rico Carro, Austin, TX (US); Jose Alberto Joao, Austin, TX (US); Richard William Earnshaw, Fulbourn (GB); Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 27 days.

(21) Appl. No.: 16/182,741

(22) Filed: Nov. 7, 2018

(65) Prior Publication Data

US 2020/0142826 A1    May 7, 2020

(51) Int. Cl.
*G06F 12/00* (2006.01)
*G06F 12/0802* (2016.01)
*G06F 13/00* (2006.01)
*G06F 13/28* (2006.01)

(52) U.S. Cl.
CPC ...... *G06F 12/0802* (2013.01); *G06F 2212/60* (2013.01)

(58) Field of Classification Search
CPC .......................... G06F 12/0802; G06F 2212/60
See application file for complete search history.

(56) References Cited

U.S. PATENT DOCUMENTS

| | | | | |
|---|---|---|---|---|
| 6,601,144 B1* | 7/2003 | Arimilli | ............ | G06F 12/0831 711/120 |
| 2004/0260906 A1* | 12/2004 | Landin | ................ | G06F 12/0284 711/203 |
| 2009/0172294 A1* | 7/2009 | Fryman | ............... | G06F 12/0817 711/141 |

(Continued)

FOREIGN PATENT DOCUMENTS

CN    102270180    12/2011

OTHER PUBLICATIONS

International Search Report and Written Opinion of the International Searching Authority for PCT/GB2019/052384 dated Nov. 8, 2019, 18 pages.

(Continued)

*Primary Examiner* — Mark A Giardino, Jr.
(74) *Attorney, Agent, or Firm* — Nixon & Vanderhye P.C.

(57) ABSTRACT

Aspects of the present disclosure relate to an apparatus comprising a requester master processing device having an associated private cache storage to store data for access by the requester master processing device. The requester master processing device is arranged to issue a request to modify data that is associated with a given memory address and stored in a private cache storage associated with a recipient master processing device. The private cache storage associated with the recipient master processing device is arranged to store data for access by the recipient master processing device. The apparatus further comprises the recipient master processing device having its private cache (Continued)

storage. One of the recipient master processing device and its associated private cache storage is arranged to perform the requested modification of the data while the data is stored in the cache storage associated with the recipient master processing device.

20 Claims, 4 Drawing Sheets

(56) References Cited

U.S. PATENT DOCUMENTS

| | | |
|---|---|---|
| 2011/0202726 A1 | 8/2011 | Laycock et al. |
| 2011/0289510 A1* | 11/2011 | Lin .................. G06F 9/3004 |
| | | 718/106 |
| 2014/0032853 A1 | 1/2014 | Lih et al. |
| 2017/0168939 A1 | 6/2017 | Jalal et al. |

OTHER PUBLICATIONS

J. Archibald et al, "Cache Coherence Protocols: Evaluation Using a Multiprocessor Simulation Model" *ACM Transactions on Computer Systems*, vol. 4, No. 4, Nov. 1986, pp. 273-298.

J.B. Lee et al, "Selective Write-Update: A Method to Relax Execution Constraints in a Critical Section" *IEICE Transactions on Information and Systems.*, vol. E81-D, Nov. 1, 1998, pp. 1186-1194.

* cited by examiner

APPARATUS AND METHOD OF MODIFICATION OF STORED DATA

BACKGROUND

Technical Field

The present technique relates to the field of processing devices and, more particularly, to the processing of data modification requests in systems comprising multiple such processing devices.

Technical Background

Some data processing systems, for example multi-core processors, comprise multiple processing devices such as processing cores, which may be implemented within the same chip. Such multiple processing devices can operate in parallel, thereby improving processing performance.

SUMMARY

At least some examples provide an apparatus comprising:
a requester master processing device having an associated private cache storage to store data for access by the requester master processing device, the requester master processing device being arranged to issue a request to modify data that is associated with a given memory address and stored in a private cache storage associated with a recipient master processing device, the private cache storage associated with the recipient master processing device being arranged to store data for access by the recipient master processing device; and
the recipient master processing device having its private cache storage,
one of the recipient master processing device and its associated private cache storage being arranged to perform the requested modification of the data while the data is stored in the cache storage associated with the recipient master processing device.

Further examples provide a home node apparatus comprising:
receiving circuitry to receive, from a requester master processing device, a request to modify data associated with a given memory address;
forwarding circuitry to forward the request to a private cache storage associated with a recipient master processing device, for the requested modification to be performed, on the data, while the data is stored in a unique coherency state in the private cache storage associated with the recipient master processing device.

Further examples provide an apparatus comprising:
a recipient master processing device; and
a private cache storage to store data for access by the recipient master processing device, wherein:
the private cache storage is arranged to receive, from a home node device, a forwarded request to modify data associated with a given memory address, the forwarded request originating from a requester master processing device; and
when the data is stored in a unique coherency state in the private cache storage, one of the recipient master processing device and the private cache storage is arranged to perform the requested modification of the data in the cache storage.

Further examples provide a method in a home node device, the method comprising: receiving, from a requester master processing device, a request to modify data associated with a given memory address; and
forwarding the request to a private cache storage associated with a recipient master processing device, for the requested modification to be performed, on the data, while the data is stored in a unique coherency state in the private cache storage associated with the recipient master processing device.

Further aspects, features and advantages of the present technique will be apparent from the following description of examples, which is to be read in conjunction with the accompanying drawings.

DESCRIPTION OF EXAMPLES

As explained above, some data processing systems include multiple processing devices operating in parallel. In some such systems, each such processing device has an associated private cache storage to store data for access by that processing device. The latency associated with accessing data in a private cache is typically lower than that associated with accessing data that is stored in other storage devices, for example a shared cache and/or main memory accessible to all processing devices. A given processing device can thus fetch required data into its private cache and perform processing operations on that data whilst it is stored in the private cache, thereby incurring lower latency than if the data were maintained in shared storage during the performance of the processing operations.

However, whilst the use of private caches does provide a performance increase, a problem is presented if data that is stored in the private cache of a first processing device is to be modified by a second processing device. If the data is made available by way of the first device relinquishing control of the data and providing it to a shared storage or to the private cache of the second device, the data is then no longer immediately available to the first device. This causes higher latency if the first device is subsequently to modify the data again. Furthermore, this can cause an inefficient "ping-pong" effect by which the data is regularly passed between the caches of the first and second devices.

In addition, a performance penalty is incurred both from the time waiting for the first device to relinquish control of the data and also from the time waiting for the data to be made available in the shared storage or the private cache of the second storage. This effect is magnified if the data is at least intermittently modified by both the first and second processing devices: each time the control of the data is to be changed, it must be either be passed between private caches (incurring the aforementioned "ping-pong" performance inefficiency as a consequence of the time required to transfer the data between the caches) or maintained in a shared cache (preventing the use of private caches and thereby not providing the attendant advantages thereof).

An example of the present disclosure addresses this by way of an apparatus comprising a requester master processing device and a recipient master processing device, each of which has an associated private cache storage arranged to store data for access by the corresponding master processing device. "Requester" and "recipient" are labels in respect of the particular functionality described herein: both devices may in general be particular devices of a set of similar devices, such that any pair of devices can assume the roles of "requester" and "recipient" at a given time.

The requester master processing device is arranged to issue a request to modify data that is associated with a given memory address and stored in the private cache storage of the recipient master processing device. The request may be issued specifically to the private cache storage of the recipient master processing device. Alternatively, the request may be broadcast and then detected by the recipient master processing device. In examples, the requested modification is a modification that can be performed without caching the data in the private cache storage associated with the requester master device.

One of the recipient master processing device and its associate private cache storage is arranged to perform the requested modification of the data while the data is stored in the cache storage associated with the recipient master processing device.

In comparative systems in which aspects of the present disclosure are not implemented, the requested modification would be performed either by providing the data in question to the private cache of the requester device, within which the modification would be performed, or by providing the data in question to a shared location such as a shared cache or main memory, within which the modification would be performed. This moving of the data can be relatively time-consuming, in particular where the on-chip network is congested. This moving of the data also increases power requirements. The presently described apparatus averts the need for this time-consuming moving of the data by allowing the requested modification to be performed without providing the data in question to the private cache of the requester master processing device or to a shared storage.

Some systems provide for data to be stored in different coherency states. For example, a given data item could be stored in a unique coherency state in the private cache of a device, in which that device is able to modify the data locally without informing a home node or other devices which could have cached data from the same address. Alternatively, a given data item could be stored in the private cache in a shared coherency state, in which modifications to the data in the private cache would be signalled to other devices which could cache data from the same address so that those other devices can invalidate now out-of-date versions of the data if necessary. The coherency states may be managed by a further device communicatively coupled with the master processing devices. Provision of coherency states in this manner allows coherency of data to be maintained when access to the data is shared between devices.

In a comparative system implementing such coherency states, if the data to be modified was in an exclusive coherency state in the private cache of the recipient device, in order for the modification requested by the requesting device to be carried out the unique state would need to be relinquished. The data would then need to be moved to the private cache of the requester device, or to a shared location. As explained above, such moving can be time-consuming and increase power requirements.

In an example of the present disclosure, the one of the recipient master processing device and its associated private cache storage is arranged to perform the requested modification of the data while the data is stored in a unique coherency state in the cache storage associated with the recipient master processing device. The modification can thus be performed without the recipient device having to relinquish the exclusive coherency state, such that the data can remain in the private cache of the recipient device. Performance is thereby improved, for example when the recipient device next accesses the data.

In an example, the request is a request to perform an atomic update operation comprising the requested modification. An atomic update is an indivisible set of actions, e.g. a read followed by a write wherein the data to be written and/or whether the write occurs depends on the read data, that are performed as a single uninterrupted operation. By way of example, the atomic operation may include a comparison and/or an arithmetic operation on the read value, based on which the value to be written is determined. As a consequence of performing the read and write as a single operation, other accesses to the data in question are prevented, while the atomic update is performed. Performing these actions based on a single request, in the private cache of the recipient device, can provide a performance increase over comparative systems in which multiple requests must be used and/or in which the actions are performed in a central location.

In this example, the private cache storage associated with the recipient master processing device may comprise an arithmetic logic unit to perform the requested atomic operation. The operation can thus be performed entirely within the private cache of the recipient device, as opposed to being performed by the recipient device itself. Processing efficiency is thereby improved. Alternatively, the recipient device itself (as opposed to its associated private cache) may comprise an arithmetic logic unit to perform the requested atomic operation. For example, an arithmetic unit within the data path or processing pipeline of the recipient device itself could be used to perform the arithmetic operation used in the atomic operation to calculate the value to be written.

In an alternative example, the request is a request to perform a non-temporal store operation comprising the requested modification. A non-temporal store operation is a store instruction that includes a "hint" that the data in question will not be required again by the requester device in the near future. The performance reduction that would be incurred by invalidating the copy of the data in the private cache of the recipient device is averted in the present technique in which such invalidation is not performed.

In some examples, the apparatus comprises a home node device. The home node device is configured to receive the request from the requested master processing device, and forward the request to the private cache storage associated with the recipient master processing device. The control of data access (for example to maintain cache coherency) can thus be managed by the central home node device. The requester device can thus issue the request to the home node device without any requirement to specifically identify the recipient device. There is thus no requirement for the requester device to maintain a record of which other device actually stores given data. For example, the home node device may be configured to perform the forwarding responsive to a determination that the data is stored in a unique coherency state in the private cache storage associated with the recipient master processing device.

The apparatus may comprise a shared cache, associated with the home node device, to store data for access by the requester master processing device and the recipient master processing device. Therefore, in addition to allowing the modification to be performed at the recipient's cache, the system could also allow the modification to be performed in the shared cache.

Alternatively or additionally, the private cache storage associated with the recipient master may be arranged to, based on information relating to the request, determine whether to provide the data to the home node device and transition the data to a non-unique coherency state. When it is determined to provide the data to the home node device, the private cache storage associated with the recipient master processing device may be configured to suppress performing the requested modification at the private cache storage. The requested modification can then be performed in the shared cache that is described above.

Alternatively, the private cache storage associated with the recipient master processing device may be configured to perform the determining after performing the requested modification.

Similarly, the home node device may be arranged to, based on information relating to the request, determine whether to trigger performance of the requested modification at the private cache storage of the recipient master processing device or at a shared storage location shared between the requester master processing device and the recipient storage device, such as the aforementioned shared cache.

These determinations allow the data to be provided to a shared storage such as a shared cache in situations in which it would be overall advantageous to do so, even when the recipient processing device still requires access to the data.

By way of illustration, in order to perform the modification in the private cache of the recipient device: the request is sent from the requester device to a home node, and from there to the recipient device; the modification is then performed, after which a response is sent from the recipient to the requester device. From the point of view of the recipient device, this approach is more efficient because it means the data can be retained in a unique coherency state at the recipient device even if the data is modified as requested by the requester device.

Conversely, in the present implementation: if the modification is to be performed in the shared storage (which would be possible in cases where the data is not stored in unique coherency state in the private cache of the recipient device), the request is sent from the requester device to the home node; the modification is then performed, after which the response is sent to the requester device. Fewer transmissions are thus performed than for the case in which the modification is performed in the private cache of the recipient device and so (from the point of view of the requester device) there is a lower time delay between the requester device issuing the request and receiving the response.

Hence, there may be a tradeoff between performing the modification in the private cache of the recipient device (better for overall performance if the recipient device is more likely to need the data again than the requester device or other processing devices of the system), and performing the modification in the shared storage (better for overall performance if the requester device or other processing devices are more likely to need the data again than the recipient device). In the examples below, information on potential usage of the data by the recipient device and other processing devices can be used to make a decision on whether it is preferable for the recipient device to perform the requested modification locally, or to relinquish control and allow the modification to be performed in the shared location.

The determination of where to perform a given requested modification can be performed in various ways. For example, the information relating to the request, on which the aforementioned determinations are based, may comprise a count of the number of modification requests received, from the home node device, in respect of the data. The counter may be a single bit, such that the data is returned to the shared cache after a single request is received, from a different processing device, to modify that data. Alternatively, a multi-bit counter may be used to track the number of modification requests. If the number of modification requests specifying the same address reaches a threshold (e.g. 1 in the case of a 1-bit counter), then the modification request may trigger the recipient to relinquish the unique coherency state (if necessary) and provide control to the shared location or to the cache of the requester device to perform the modification.

Alternatively or additionally, the information relating to the request may comprise an occupancy of a queue of pending requests for modification of data received from the home node device. Similarly to the counter of received requests, a queue occupancy above a threshold may be taken to indicate that the requests would be more efficiently served by returning the data in question to the shared cache.

Alternatively or additionally, the information relating to the request may comprise cache replacement policy information such as a recency of access to the data item in question. For example, if the data item was recently accessed by the recipient device, it may be maintained in the private cache storage of the recipient device. Conversely, if the data item was not recently accessed by the recipient device, it may be returned to the shared cache or provided to the cache of the requester device. This exploits the fact that data recently accessed by the recipient device may be more likely be needed by the recipient device again in the near future, so that this may be an indication that overall system performance could be greater if the recipient device can perform the requested modification locally so that it can retain the unique coherency state, even if this would make servicing of the modification request from the point of view of the requester device slower.

In another example, the data item may be returned to the shared device if neither the requester device nor the recipient device is expected to use the data item in the near future.

In examples, the private cache storage associated with the recipient master processing device comprises a first level cache and a second level cache, such that a lower access latency is associated with the first level cache than the second level cache. The aforementioned information relating to the request may then comprise an indication of whether the data is in the first level cache or the second level cache. For example, when the data is in the first level cache, it may be assumed that the data is likely to be required again by the recipient device, and the requested modification may be performed in the private cache of the recipient device. Conversely, when the data is in the second level cache, it may be assumed that the data is less likely to be required again by the recipient device (for example by virtue of having been evicted from the first level cache), and thus that the performance gain for the requester device that would be associated with performing the modification (and similar future modification requests) in the shared cache would outweigh the performance gain in the recipient device that would be associated with performing the modification in the private cache thereof. The data may thus be returned to the shared cache.

In an example the recipient master processing device is configured to, when a cache line comprising the data is invalidated while the request is pending, buffer the invalidation request for carrying out after the request is performed. If such an invalidation is to be accepted immediately, in some examples the data is placed in an intermediate coherence state indicating that it is in an update and invalidation.

issue a failure notification to the home node in respect of the request. The failed request can then be processed as appropriate, for example by carrying out the modification in a shared cache or forwarding the failure notification to the requesting device.

In another example, a failure notification is not issued and instead the invalidation is buffered until the request has been performed. Alternatively, the recipient device could use the invalidation to make a determination that the data item should be returned to the shared cache for performing the request.

In an example, the private cache storage associated with the recipient master device is configured to, after performing the requested modification, update replacement policy information associated with a cache line comprising the modified data to increase a probability of the cache line being selected for eviction in a future cache eviction. Updating the replacement policy may comprise indicating the cache line as the least-recently-used cache line. A subsequent cache miss can then cause that data to be evicted from the cache, thereby returning the data to the shared cache if it is not frequently required by the recipient device.

In an example, the private cache storage associated with the recipient master processing device is arranged to provide, to at least one of the requester master processing device and a home node device, a return value in response to the request. If sent to the home node device, the home node device may forward the return value to the requester master processing device and/or indicate a corresponding cache line as not being in a dirty state. The requested modification may for example be part of an operation such as an atomic operation that requires a return value. The return value can be provided in a transmission having a size smaller than a cache line size of said private cache storage. Bandwidth is thus reduced relative to comparative systems in which the cache line comprising the data is provided to a device that requests access to the data.

Examples of the present disclosure will now be described with reference to the Figures.

Figure 1:
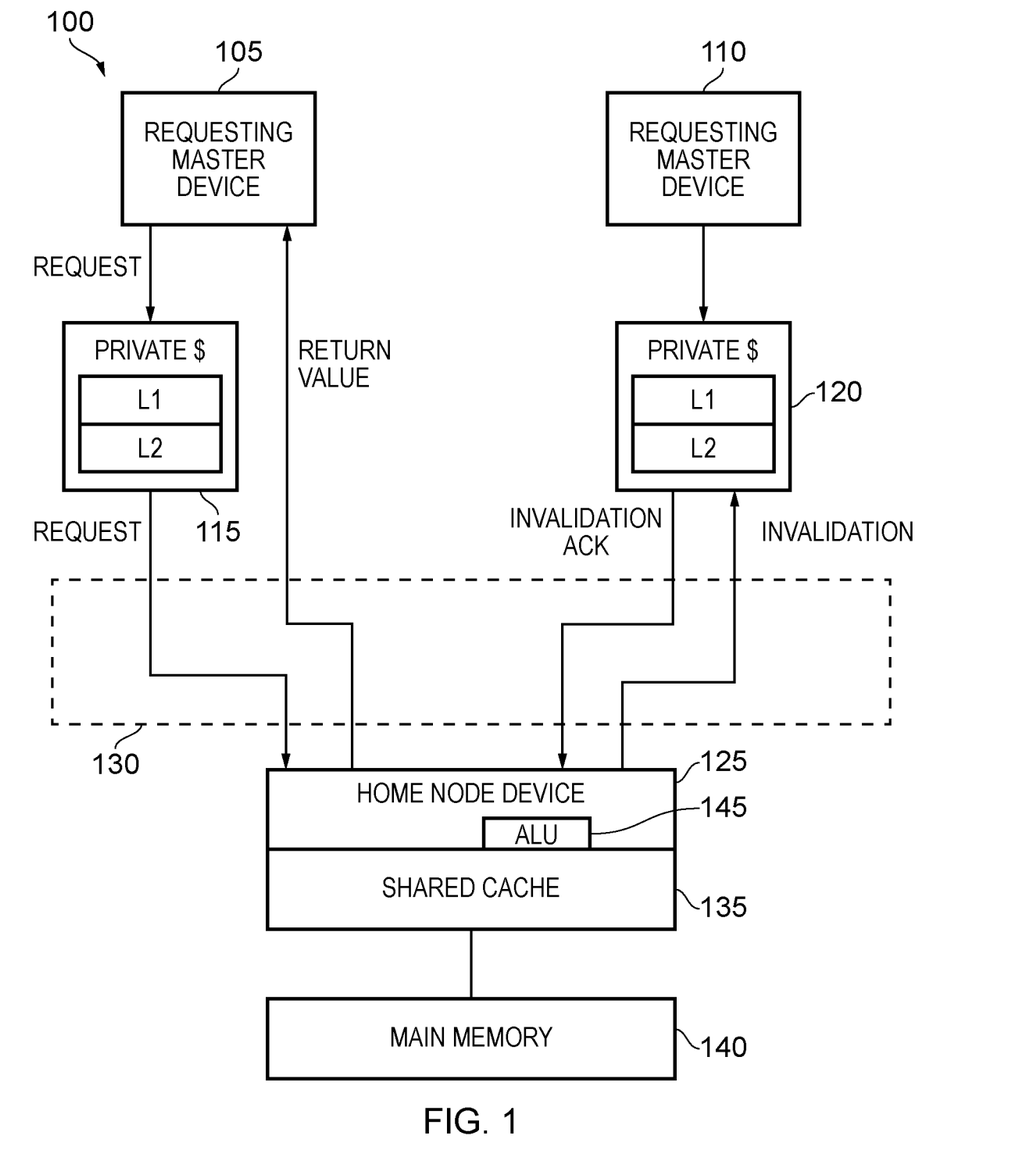
FIG. 1 shows schematically a comparative processing system.

FIG. 1 shows schematically a comparative processing system 100 that does not implement the above-described examples of the present disclosure. The system 100 comprises a requesting master processing device 105 and a recipient master processing device 110. The system 100 may for example be a multi-core processor wherein the devices 105, 110 are processing cores. Each device 105, 110 has an associated private cache storage 115, 120. The private caches are multi-level caches with a first level cache L1 and a second level cache L2.

The system 100 further comprises a home node device 125 that communicates with the devices 105, 110 and their associated private caches 115, 120 via an interface 130, for example an on-chip network interface. The home node device 125 has an associated shared cache 135. Data can be retrieved from a main memory 140 and cached in the shared cache 135, for access by the requesting device 105 and the recipient device 110.

As described above, if only one of the devices 105, 110 needs to access cached data for a particular address, overhead can be reduced by granting that device 105, 110 exclusive access to the data in question and storing a copy of the data in the private cache 115, 120 of that device 105, 110. When data is cached in the exclusive coherency state, it is not necessary for modifications to the data by that device to be communicated to the home node or other devices until the data is evicted from that device's private cache. In contrast, when data is cached in a shared coherency state, a modification by one device 105, 110 is signalled to the home node device 125, which may trigger other devices which could be caching the same data to invalidate any local (now out of date) copies of data from the same address.

An operation flow will now be described by which the requesting device 105 can request that an operation be performed on data to which the recipient device 110 has been granted exclusive access, the data being stored in its private cache 120.

The requesting device 105 issues a request in respect of the operation to its private cache 115. It is determined that the data is not present in its private cache 115 and the request is forwarded, via the interface 130, to the home node device 125.

At the home node device it is determined that the data is stored in the private cache 120 of the recipient device 110 (or alternatively, if the home node does not retain a record of which caches are storing which addresses, the home node could simply broadcast invalidation requests to all other devices which could be caching data from the requested address). An invalidation request in respect of the data is issued from the home node device 125 to the private cache 120 of the recipient device 110. The cache line containing the data is then invalidated in the private cache 120 and (if dirty) written back to the shared cache 135.

The requested operation is then performed on the data in the shared cache 135 by an arithmetic logic unit 145 of the home node device 125. Finally, a return value of the operation is transmitted to the requesting device 105. Alternatively, the data may be transmitted to the private cache 115 of the requesting device 105 for the requesting device 105 to perform the operation.

As described above, the described operation flow within the system 100 incurs performance penalties by invalidating and writing back the data from the private cache 120 of the recipient device 110 before the operation can be carried out. These penalties are exacerbated in situations in which the recipient device 110 later requires access to the data, such that the data must either be returned to its private cache 120 or remain in the shared cache 135 (thereby incurring increased access latency for the recipient master device 110 when it needs the same data again). As mentioned above, this can cause an inefficient "ping-pong" effect in which the data is passed back and forth between the private cache 120 of the requesting device 105 and the private cache 120 of the recipient device 110.

Figure 2:
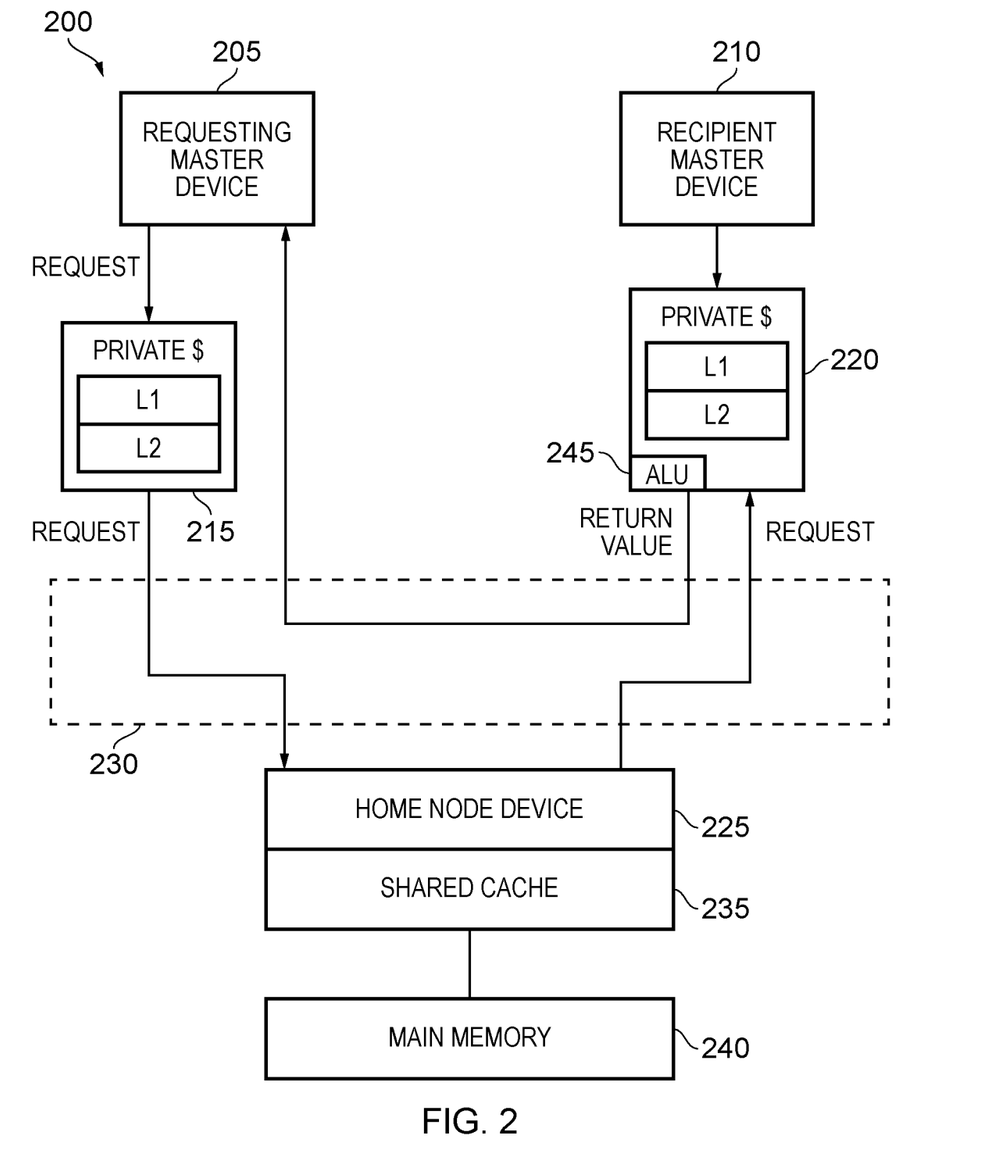
FIG. 2 shows schematically a processing system according to examples of the present disclosure.

FIG. 2 shows schematically an example system 200 according to examples of the present disclosure, in which the above-described performance penalties are mitigated.

The system 200 comprises a requesting master processing device 205, recipient master processing device 210, private caches 215, 220 associated therewith, a home node device 225 associated with a shared cache 235, an interface 230, and a main memory 240, each of which operate in a similar manner to the same-named components of the above-described system 100, except as set out below.

An operation flow will now be described by which the requesting device 205 can request that an operation be performed on data to which the recipient device 210 has been granted exclusive access, the data being stored in its private cache 220. As will be seen, this flow mitigates the above-described performance penalties associated with the system 100.

The requesting device 205 issues a request to its private cache 215 in respect of the operation. It is determined that the data in question is not stored in the private cache 215 and the request is thus forwarded, via the interface 230, to the home node device 225 as set out above in relation to FIG. 1.

The home node device determines that the data is stored in the private cache 220 of the recipient device. The request is then forwarded to that private cache 220, where the requested operation is performed by an arithmetic logic unit 245 of the private cache 220. The forwarding functionality may be implemented via use of a network-on-chip or interconnect communication protocol configured to support such forwarding. A return value of the operation is then returned, via the interface 230, to the requesting device 205.

As set out above, the system 200 allows operations to be requested by a requester master processing device, in respect of data that is stored in a private cache of a recipient master processing device, and then performed in the private cache of the recipient master processing device. The above-described performance penalties associated with the invalidation and writeback of the data in question in the system 100 are thereby mitigated. In particular, the aforementioned "ping-pong" inefficiency is averted. The presently described arrangement is particularly efficient in situations in which the requesting master device 205 requires intermittent access to the data and the recipient master device 210 requires more frequent access to the data.

Furthermore, the home node device 225 has only to forward the request, but not to perform the requested operation nor to process the returning of the return value. The performance of the home node device 225 is thereby improved. This approach is unusual as normally when data is cached in a unique coherency state within the private cache 220 of a particular master device 210, the only device that would be permitted to modify that data would be that master device 210 itself, but in this operation flow shown in FIG. 2 the requesting master device 205 is able to trigger a modification of the data while the data remains in unique coherency state in the recipient master device 210. This approach can be useful not only for atomic requests, but also for non-temporal store operations, or other operations where the requesting master device 205 requests a modification of the data associated with a particular address but does not need the data to be returned to its own private cache 215.

Figure 3:
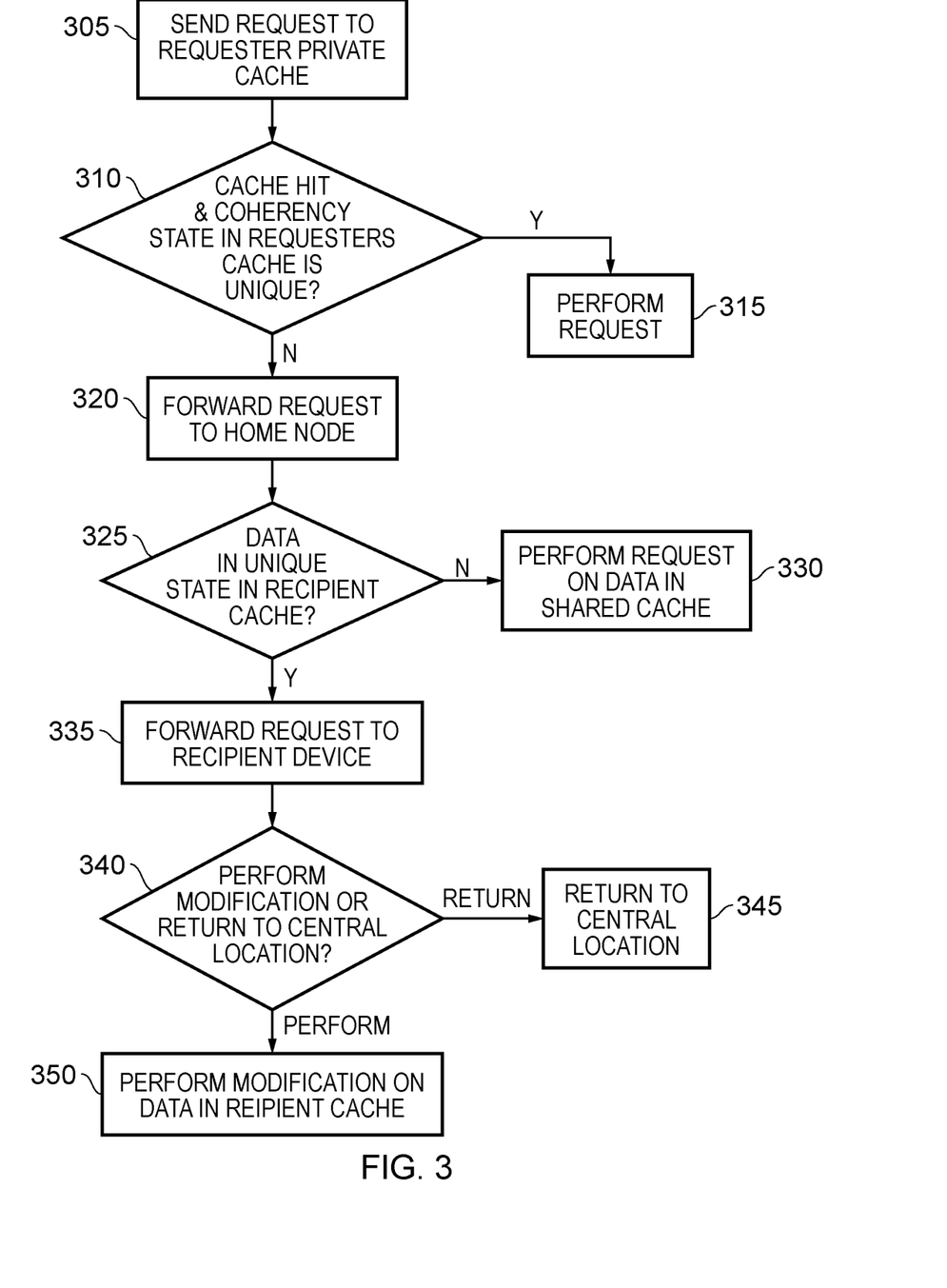
FIG. 3 is a flow diagram of a method according to examples of the present disclosure.

FIG. 3 is a flow diagram illustrating a method according to examples of the present disclosure.

At block 305 a request to modify data is sent from a requester device to its private cache.

At block 310 it is determined whether there is a cache hit in the private cache in respect of the data and, if so whether the data has a unique coherency state. As explained above, the unique coherency state is a coherency state in which the device holding the cache data is able to modify the data locally without informing a home node or other devices of the system which could potentially hold cached data for the same address. If there is a cache hit and the data has a unique coherency state, the requested modification is performed in the private cache at block 315.

Otherwise, flow proceeds to block 320, where the request is forwarded to a home node device.

At block 325 it is determined whether the data is stored in a unique coherency state in a private cache associated with a recipient device. If not, flow proceeds to block 330 where the requested modification is performed on the data in a shared cache associated with the home node device.

Otherwise, flow proceeds to block 335, where the request is forwarded to the recipient device.

At block 340 it is determined whether to perform the modification at the recipient device, or to return the data to a central location such as the aforementioned home node. As described above, this determination can be based on various factors such as a value of a counter of received requests and/or an occupancy of a request queue.

If it is determined to perform the request at the central location, flow proceeds to block 345 where the data is returned to the central location.

If it is determined to perform the modification at the recipient device, flow proceeds to block 350 where the requested modification is performed in the private cache of the recipient device.

Figure 4:
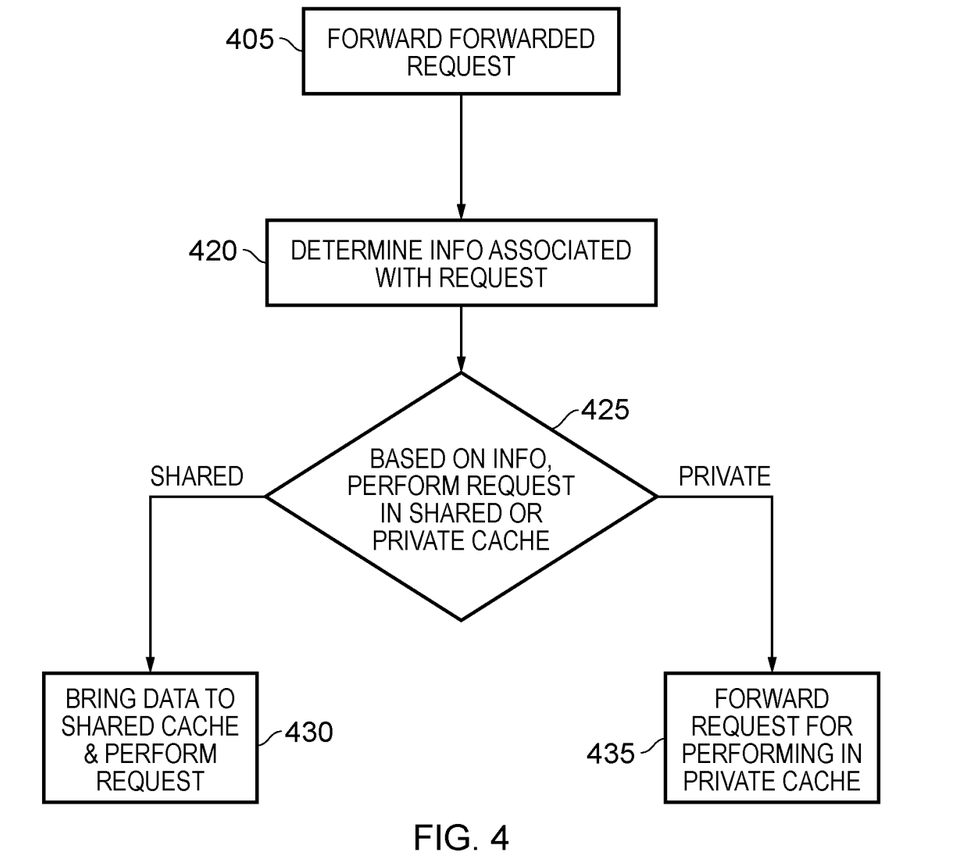
FIG. 4 is a flow diagram illustrating a method in a home node device according to examples of the present disclosure.

FIG. 4 is a flow diagram illustrating a method in a home node device according to examples of the present disclosure. As described above, the home node device is communicatively coupled with various master processing devices.

At block 405 a request to modify data is received, having been forwarded from a requester master processing device.

At block 420, information associated with the request is determined. The information may include one or more of a count of the number of modification requests received in respect of the data, an occupancy of a queue of pending requests for modification of the data, and cache replacement policy information such as a recency of access to the data item in question.

At block 425 it is determined, based on the aforementioned information associated with the request, whether to perform the request in the shared cache or in the private cache in which the data is stored. For example, as explained above, the determination to perform the request in the shared cache may be responsive to the count of received requests exceeding a threshold. The determination may, alternatively or additionally, be responsive to the occupancy of the queue of pending requests exceeding a threshold. The determination may be responsive to the last access to the data in question being not recent. The determination may be responsive to a particular cache level in which the data is stored, for example a first level cache or a second level cache.

If it is determined to perform the request in the shared cache, flow proceeds to block 430 where the data is brought to the shared cache, for example including invalidating the data in the private cache in which it was stored. The request is then performed in the shared cache.

If it is determined to perform the request in the private cache, flow proceeds to block 435 where the request is forwarded for performing in the private cache. For example, the request may be unicast to that private cache. Alternatively, the request may be broadcast to the private caches of all master processing devices and ignored by all devices other than the one at which the data is stored.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
a requester master processing device having an associated private cache storage to store data for access by the requester master processing device, the requester master processing device being arranged to issue a request to modify data that is associated with a given memory address and stored in a private cache storage associated with a recipient master processing device, the private cache storage associated with the recipient master processing device being arranged to store data for access by the recipient master processing device;
the recipient master processing device having its private cache storage,
one of the recipient master processing device and its associated private cache storage being arranged to perform the requested modification of the data while the data is stored in the private cache storage associated with the recipient master processing device; and
a home node device to:
receive the request from the requester master processing device; and
forward the request to the private cache storage associated with the recipient master processing device,
wherein the private cache storage associated with the recipient master processing device is arranged to, based on information relating to the request, determine whether to provide the data to the home node device and transition the data to a non-unique coherency state.

2. An apparatus according to claim 1, wherein the one of the recipient master processing device and its associated private cache storage is arranged to perform the requested modification of the data while the data is stored in a unique coherency state in the cache storage associated with the recipient master processing device.

3. An apparatus according to claim 1, wherein the requested modification is a modification that can be performed without caching the data in the private cache storage associated with the requester master device.

4. An apparatus according to claim 1, wherein the request is a request to perform an atomic update operation comprising the requested modification.

5. An apparatus according to claim 4, wherein the private cache storage associated with the recipient master processing device comprises an arithmetic logic unit to perform the requested atomic operation.

6. An apparatus according to claim 1, wherein the request is a request to perform a non-temporal store operation comprising the requested modification.

7. An apparatus according to claim 1, comprising a shared cache, associated with the home node device, to store data for access by the requester master processing device and the recipient master processing device.

8. An apparatus according to claim 1, wherein when it is determined to provide the data to the home node device, the private cache storage associated with the recipient master processing device is arranged to suppress performing the requested modification at the private cache storage.

9. An apparatus according to claim 1, wherein the private cache storage associated with the recipient master processing device is arranged to perform the determining after performing the requested modification.

10. An apparatus according to claim 1, wherein the home node device is arranged to, based on information relating to the request, determine whether to trigger performance of the requested modification at the private cache storage of the recipient master processing device or at a shared storage location shared between the requester master processing device and the recipient storage device.

11. An apparatus according to claim 10, wherein the information relating to the request comprises at least one of:
a count of the number of modification requests received, from the home node device, in respect of the data;
an occupancy of a queue of pending requests for modification of data received from the home node device; and
cache replacement policy information.

12. An apparatus according to claim 10, wherein:
the private cache storage associated with the recipient master device comprises a first level cache and a second level cache; and
the information relating to the request comprises an indication of whether the data is in the first level cache or the second level cache.

13. An apparatus according to claim 1, wherein the recipient master processing device is configured to, when a cache line comprising the data is invalidated while the request is pending, either:
buffer the invalidation;
place the data into an intermediate coherence state; or
issue a failure notification to the home node in respect of the request.

14. An apparatus according to claim 1, wherein the home node device is arranged to:
determine that the data is stored in a unique coherency state in the private cache storage associated with the recipient master processing device; and
responsive to determining, perform the forwarding.

15. An apparatus according to claim 1, wherein the private cache storage associated with the recipient master device is configured to, after performing the requested modification, update replacement policy information associated with a cache line comprising the modified data to increase a probability of the cache line being selected for eviction in a future cache eviction.

16. An apparatus according to claim 15, wherein the updating the replacement policy comprises indicating the cache line as the least-recently-used cache line.

17. An apparatus according to claim 1, wherein the private cache storage associated with the recipient master processing device is arranged to provide, to at least one of the requester master processing device and a home node device, a return value in response to the request.

18. An apparatus according to claim 17, wherein the private cache storage associated with the recipient master processing device is arranged to provide the return value in a transmission having a size smaller than a cache line size of said private cache storage.

19. A home node apparatus comprising:
receiving circuitry to receive, from a requester master processing device, a request to modify data associated with a given memory address; and
forwarding circuitry to forward the request to a private cache storage associated with a recipient master processing device, for the requested modification to be performed, on the data, while the data is stored in a unique coherency state in the private cache storage associated with the recipient master processing device, and for the private cache storage associated with the recipient master processing device to, based on information relating to the request, determine whether to provide the data to the home node apparatus and transition the data to a non-unique coherency state in the private cache storage.

20. An apparatus comprising:

a recipient master processing device; and a private cache storage to store data for access by the recipient master processing device, wherein:

the private cache storage is arranged to receive, from a home node device, a forwarded request to modify data associated with a given memory address, the forwarded request originating from a requester master processing device;

when the data is stored in a unique coherency state in the private cache storage, one of the recipient master processing device and the private cache storage is arranged to perform the requested modification of the data in the private cache storage: and wherein the private cache storage is arranged to, based on information relating to the forwarded request, determine whether to provide the data to the home node device and transition the data to a non-unique coherency state.

* * * * *